Patented Jan. 9, 1923.

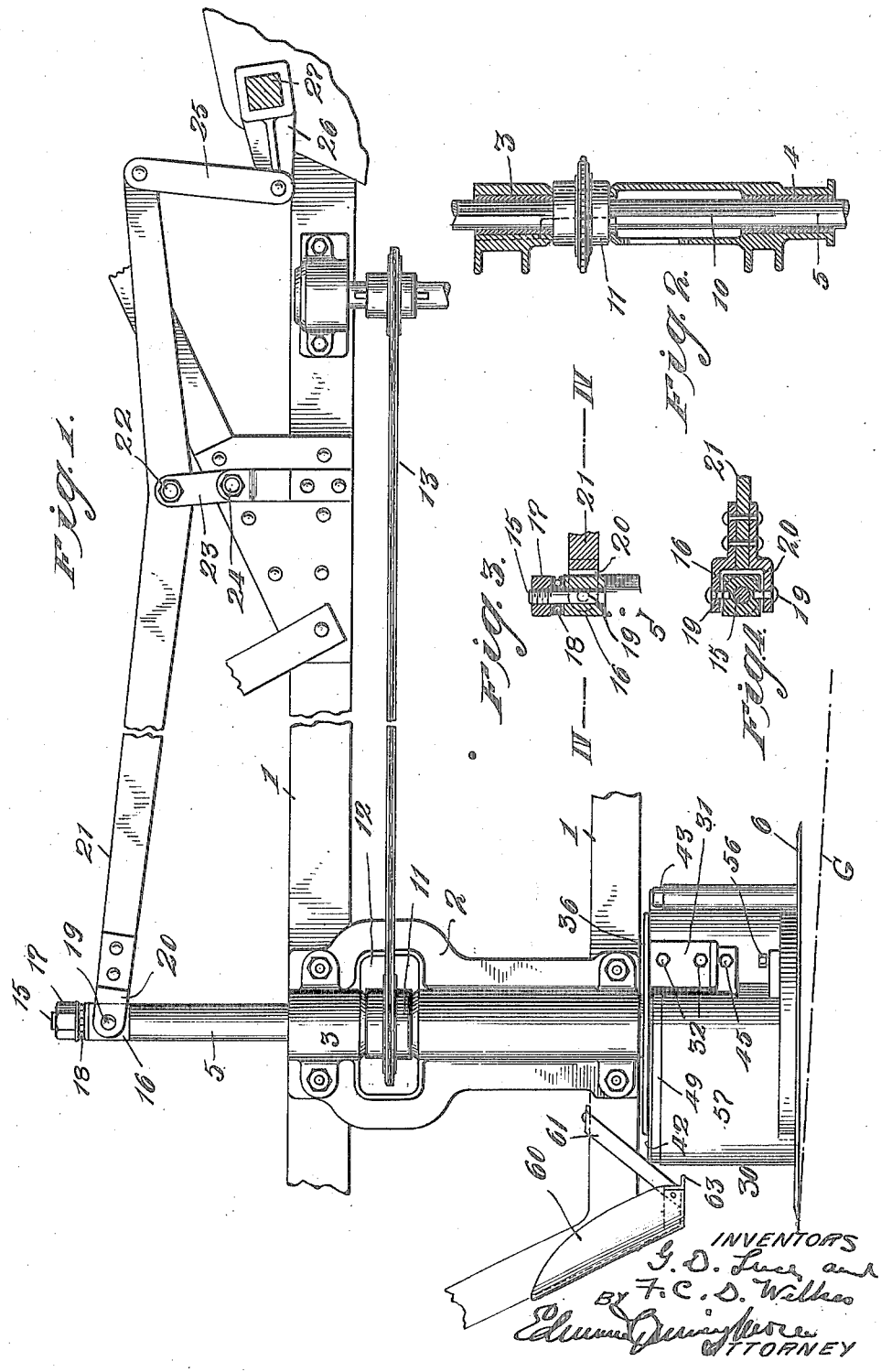

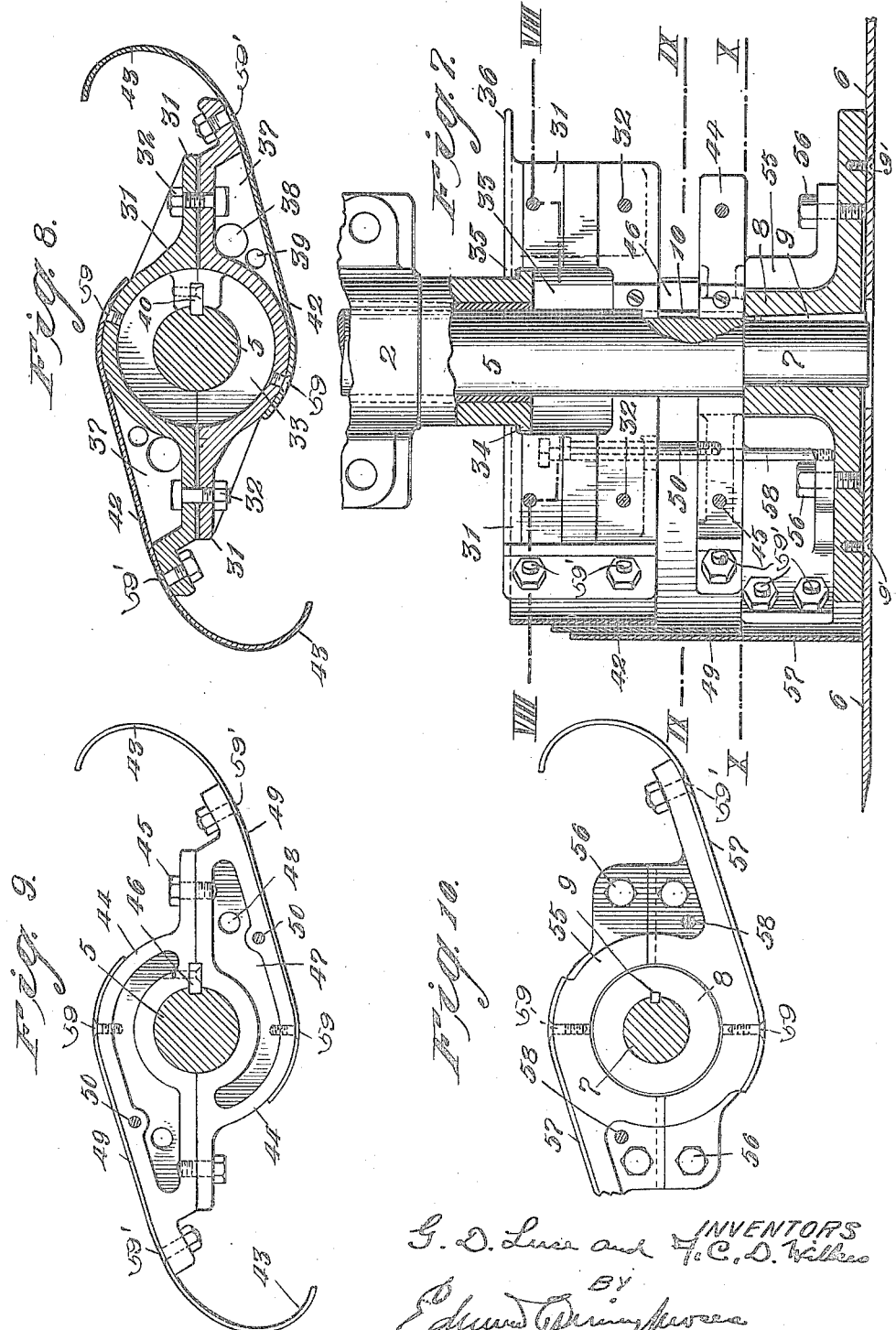

1,442,032

UNITED STATES PATENT OFFICE.

GEORGE D. LUCE AND FREDERICK C. DOUGLAS WILKES, OF WATERTOWN, WISCONSIN, ASSIGNORS, BY DIRECT AND MESNE ASSIGNMENTS, TO LUCE CANE HARVESTER CORPORATION, OF NEW YORK, N. Y., A CORPORATION OF DELAWARE.

BOTTOM-CUTTING AND TRASH-IMPELLING MEANS.

Application filed July 21, 1919. Serial No. 312,316.

*To all whom it may concern:*

Be it known that we, GEORGE D. LUCE, a citizen of the United States, residing in Watertown, county of Jefferson, and State of Wisconsin, and FREDERICK C. DOUGLAS WILKES, a citizen of the Dominion of Canada, residing in Watertown, county of Jefferson, and State of Wisconsin, have invented certain new and useful Improvements in Bottom-Cutting and Trash-Impelling Means, of which the following is a specification.

This invention relates to improvements in machinery for harvesting sugar cane and the like, and more especially to rotary cutting knives for cutting off the cane at or below the ground level, and to means for preventing trash from interfering with the proper operation of the cutting knives. The invention comprises certain improvements in trash impellers of the character set forth in patent to George D. Luce, No. 1,207,580, dated December 5, 1916, and improvements in certain other features of construction of cutters and associated parts, as will more fully appear from the following detailed description of one preferred embodiment of the invention which is illustrative of the principle thereof, and the best mode now known to us for performing the same.

In the accompanying drawings which form a part of this specification, Figure 1 is a side elevation showing a fragment of the frame of a cane harvesting machine, one of the disc cutters and the means for operating and controlling it, and the trash deflecting and impelling devices associated therewith;

Figure 2 is a vertical sectional view through the cutter shaft bearing;

Figures 3 and 4 are views in vertical and horizontal section respectively, showing the connection between the cutter shaft and its elevating and depressing lever;

Figure 7 is a detail vertical sectional view on a larger scale than the previous figures, showing one of the cutters and the associated trash impeller;

Figure 8 is a horizontal section on line VIII—VIII of Figure 7;

Figure 9 is a section on line IX—IX of Figure 7; and

Figure 10 is a section on line X—X of Figure 7.

Figure 5:
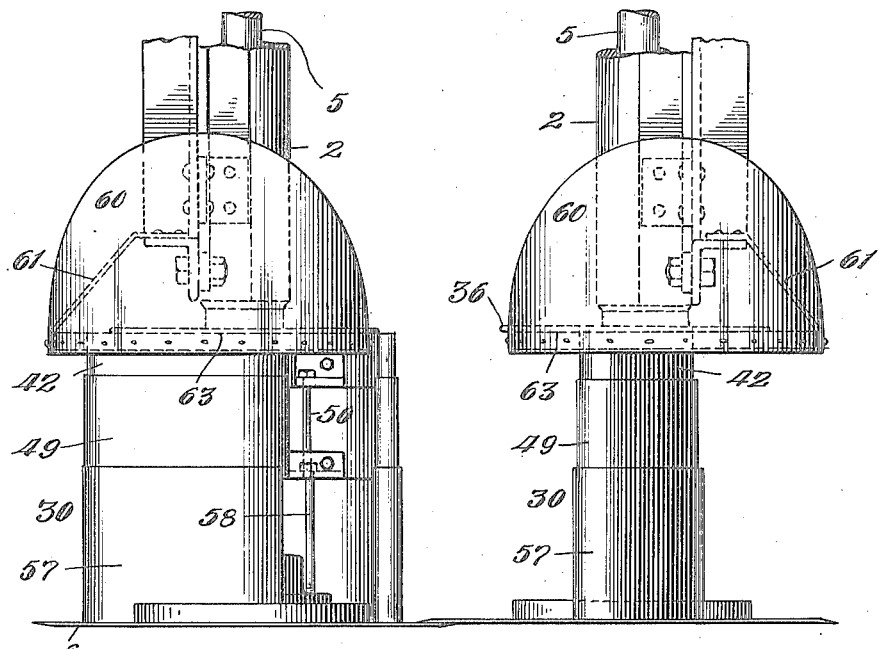
Figure 5 is a front view showing the two cutters and their trash impellers and deflectors.
Figure 6:
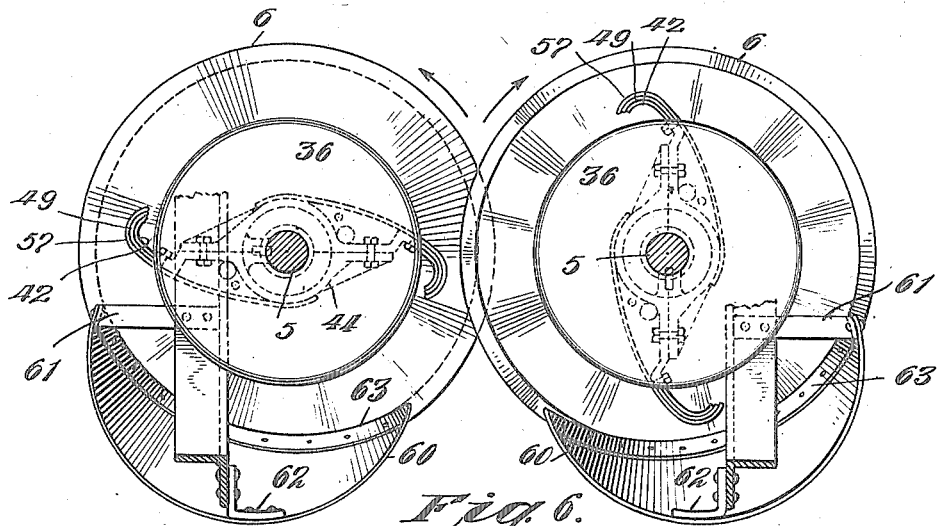
Figure 6 is a plan view of the parts shown in Figure 5.

Referring to the drawings in detail, the present invention is applicable to any type of harvester for cutting sugar cane or other crop adapted to be similarly harvested. For instance, it may be used in connection with a harvester of the general character illustrated and described in Letters Patent of George D. Luce, No. 1,053,917. The part of the frame-work of the machine carrying the operative elements embodying the present invention is designated in Figure 1 by the numeral 1. Attached to this frame-work are the bearing frames 2 having the spaced journal bearings 3 and 4 (see Figure 2), for the cutter shafts 5. Two of the latter are provided, arranged nearly vertical and side by side as shown in Figures 5 and 6, and they are mounted for both rotation and vertical adjustment in the bearing frames. At their lower ends the shafts 5 carry the sharpened disc cutters 6 which preferably overlap somewhat as shown in Figures 5 and 6.

We prefer to incline the cutter shaft bearings and cutter shafts slightly forward of the vertical which has the effect of tilting the cutting discs slightly to the ground surface so that the rear part of the discs is slightly higher than the front edges where the discs come close to, or pass under the ground. A clearance is thus provided under the rear part of the cutting discs which minimizes the pressure of the discs on the ground and thus reduces the power required to drive them. This construction is indicated in Figure 1, where the plane of the ground surface is shown by the broken line G. Comparatively slight forward inclination of the shafts is sufficient: for instance, we have successfully used a slope of one half inch in twelve inches. The cutters may be mounted on the shafts 5 in any suitable manner, for instance as shown in Figure 7, in which construction the lower ends of the shafts are reduced in diameter as indicated at 7, and have flanged hubs 8 fitted tightly thereon and fastened firmly in position by keys 9. The cutters are then secured to the flanges of the hubs by screws 9' or other suitable fastening means. The shafts 5 are provided with splines 10 and are arranged to be driven by sprockets 11 having feathers fitting in the splines 10. The bearing frames 2 are formed with openings 12 therein which receive the sprockets 11, the latter being held against vertical movement by portions of the bearing frame above and below the sprockets. The sprockets 11 may be driven in any suitable manner as by chains 13 driven from a motor (not shown) upon the harvester.

In order to effect the vertical adjustment of the cutters so as to enable them to conform to irregularities of the ground surface, and also to permit them to be lifted to inoperative position when the machine is not harvesting, means are provided for adjusting the shafts vertically in their bearings. Any suitable devices may be utilized for this purpose, but we preferably employ the construction shown in Figures 1, 3 and 4, in which the upper end of each of the shafts 5 is reduced in diameter as indicated at 15 in Figure 3 and has rotatably mounted thereon a block 16 which is retained in position by the nut 17 screwing on the upper reduced end of the shaft. A ball thrust bearing 18 is preferably interposed between the nut and the block. The block carries projecting pivots 19 which are engaged by the arms of a yoke 20 carried at the end of a lever 21. The lever is pivoted between its ends, as indicated at 22, between the upper ends of a pair of short fulcrum links 23 which are pivoted at their lower ends to the frame as indicated at 24. The rear end of the lever 21 is connected by a link 25 with an arm 26 mounted on a squared shaft 27, which is adapted to be partially rotated by suitable means (not shown) under the control of the operator. By the turning of this shaft it will be seen that the shafts 5 and the cutters 6 may be raised and lowered as desired. The links 23 permit the yoke end of the shaft to move vertically without putting any lateral strain on the shaft 5.

30 are trash impellers mounted on the cutters and their supports, and constructed so that they will telescope as the cutters are adjusted vertically. In the particular construction illustrated, each of the impellers is made in three sections, the top section being suspended from the bearing bracket, the middle section being suspended from the top section and the lower section being supported upon the cutter. Each of the sections comprises a split frame or spider having attached thereto the trash-impelling blades or fins which are preferably made of sheet metal. The upper section, as particularly illustrated in Figures 7 and 8, comprises the two spider sections 31 adapted to be secured together around the shaft by the bolts 32 and having the recess 33 adapted to receive the lower part of the bearing bracket. The latter is provided with a collar 34 adapted to be engaged by the overhanging flange 35 formed on the spider members, so as to limit the downward movement of the upper section of the impeller as the cutter is lowered. The spider members 31 are also formed to provide an outwardly extending flange 36 which assists in preventing the trash from working up towards the bearings. The spider members 31 are provided at or near their lower ends with the webs 37 having large and small perforations 38 and 39 respectively for a purpose which will appear. The spider members also have clamped between them a feather 40 which fits in the spline 10 in the shaft 5. Each of the spider members 31 has fixed thereto one of the upper impeller blades or fin members 42, the extremities of these members being preferably curved backwardly and towards the axis of the shaft as indicated at 43. The intermediate section of the impeller comprises the spider members 44 shown in Figures 7 and 9, which are bolted together around the shaft by the bolts 45 and are held from rotation upon the shaft by the feather 46. Each of the spider members 44 has a web 47 provided with a small perforation 48 in alignment with the large perforation 38 in the web of the spider member 31 above it. The spider members 44 carry the intermediate impeller blades or fins 49 which are similar in shape to the blades 42, but sufficiently larger to freely telescope over the same. The curved over outer portions of these blades fitting over the curved parts of the blades above assist in holding the blades in proper alignment. This shape of blade is also efficient in operation as it sweeps or pushes the trash out of the way without catching therein. Owing to its contour it also requires a minimum of power to operate it. When the cutters are in raised position the spiders 44 rest on the hubs 8, but as the cutters are lowered it is necessary to limit the movement of these spiders so as to maintain the intermediate section of the impeller in proper relationship with the upper section. This is accomplished in the construction illustrated by means of the limiting bolts 50, (see Figures 5 and 7), these bolts passing through the small perforations 39 (see Fig. 8) and screwing into the spider members 44. The heads on these bolts are too large to pass through perforatons 39 and so are stopped when they reach the webs 37, thus limiting further downward movement of the intermediate section of the impeller. The lower section of the impeller comprises the spider sections 55 which are bolted to the flanged hub 8 by the bolts 56 and which have secured thereto the lower trash impeller blades or fins 57 which are adapted to telescope over the intermediate blades 49. In order to prevent the cutters from being lowered sufficiently to permit complete separation or disengagement of the lower impeller section from the intermediate section, limiting bolts 58 are preferably provided, which at their lower ends screw into the spider members 55 and which pass through the small perforations 48 in the webs of the intermediate spiders, the heads of the bolts being adapted to engage the webs to prevent further lowering of the cutter and lower impeller section. The large perforations 38 in the spider members 31 permit the heads of the bolts 58 to pass freely upward when the impeller sections are telescoped.

It will be noted that the trash impeller blades 42, 49 and 57 are removably secured to their respective spider sections 31, 44 and 55 by screws 59 and bolts 59' (see Figures 7, 8, 9 and 10); thereby permitting said blades to be readily removed and replaced when necessary.

Upon portions of the frame of the machine immediately in advance of the trash impellers, inclined trash deflecting and depressing shields 60 are preferably mounted. An efficient construction is illustrated in Figures 1, 5 and 6, which show the convexly curved and forwardly and upwardly inclined trash depressing shields 60 mounted on the lower members of the frame 1 and secured thereto by brackets 61 and 62. In the construction illustrated the shields comprise sheet metal sections reinforced at their lower edges by arc-shaped channel bars 63.

In many districts where sugar cane is grown it is not the practice to cultivate the cane throughout the season, and the spaces between the cane rows become entirely covered with a tangled mass or mat of leaves, vegetable growths and especially the trash left from the previous season's cutting which is permitted to remain in the field where it falls. A heavy mat of many inches in thickness is thus formed which completely covers the ground. When the harvesting machine is to be used it is advanced along the cane row and the elevation of the cutters 6 is adjusted so that the cutters will sever the cane either at or just below the surface of the ground. It is very important that the cutters be kept at the lowest practicable level as the lower part of the cane is very rich in juice. The cutters, therefore, are obliged to travel beneath this trash mat which must be divided to permit the cutter shafts to pass through the same. To prevent the trash from winding around these rotating shafts, which it would immediately do to such an extent as to clog the same, and also to pass the portion of the trash mat between the shafts towards the rear of the machine quickly and effectively so that it will not choke the throat of the machine and prevent the rearward passage of the severed cane stalks in the machine, is the function of the trash impellers. These effectively beat or push the trash out of the way, preventing the trash from becoming entangled in any rotating parts and force the trash to one side or towards the rear of the machine where it cannot clog the operation of the latter. As the cutters are raised or lowered to follow the contour of the ground the impeller sections telescope more or less so as to completely protect the space between the cutters and the lower frame members and trash depressing shields 60, leaving no unexposed spaces into which the trash can get. The shields 60 travel just above the trash mat and prevent any loose trash from escaping the impellers. In cases where the trash mat is exceptionally thick the shields will press down the upper surface thereof so as to keep it within the zone of action of the impellers. With the construction set forth we have experienced no difficulty in operating harvesters in fields covered with the heaviest accumulations of trash.

While in the construction illustrated in the drawings the trash impellers are shown as comprising three telescopic sections, it will be understood that this is not essential, but that impellers having either a more or less number of sections may be utilized, as desired. Other modifications also may be resorted to in practicing the invention. We do not, therefore, desire to limit ourselves to the particular embodiment of the invention illustrated, but intend to cover our invention broadly in whatever form its principle may be embodied.

Having thus described our invention, we claim:—

1. In apparatus of the character described the combination of a bottom cutter, a rotary driving shaft therefor, means movable with the shaft for protecting the same from trash, and trash depressing means cooperating therewith.

2. In apparatus of the character described the combination of a rotary bottom cutter, a carrying and driving shaft therefor, trash impelling means rotatable with said shaft, and relatively fixed trash depressing means cooperating therewith.

3. In apparatus of the character described the combination of a substantially upright rotatable shaft, a substantially horizontal disc cutter mounted on the lower end thereof, trash impelling blades rotatable with said shaft, and relatively fixed trash depressing means mounted adjacent to the upper ends of said trash impelling blades.

4. In apparatus of the character described a rotary cutter, a carrying and driving shaft therefor, and a trash depressing shield mounted in front of said shaft above said cutter.

5. In apparatus of the character described the combination of laterally spaced substantially upright rotatable shafts, substantially horizontal disc cutters mounted on the lower ends thereof, and trash deflecting shields mounted in front of each of said shafts above said cutters.

6. In apparatus of the character described, the combination of a substantially upright rotatable shaft, a substantially horizontal disc cutter mounted on the lower end thereof, and a forwardly and upwardly inclined trash depressing shield mounted in front of said shaft above said cutter.

7. In apparatus of the character described the combination of laterally spaced substantially upright rotatable shafts, substantially horizontal disc cutters mounted on the lower ends thereof, and trash deflecting shields mounted in front of each of said shafts above said cutters, said shields being forwardly and upwardly inclined and being convexed towards the front.

8. In apparatus of the character described, the combination of a rotary bottom cutter, a carrying and driving shaft therefor, trash impelling means rotatable with said shaft, and trash deflecting means adapted to engage the trash above said trash impelling means and to deflect it into the zone of action of said impelling means.

9. In apparatus of the character described, the combination of a rotary bottom cutter, a carrying and driving shaft therefor, trash impelling means rotatable with said shaft and trash deflecting means cooperating with said trash impelling means and having deflecting surfaces extending transversely with respect to the direction of travel of the apparatus.

10. In apparatus of the character described the combination of a substantially upright rotary shaft, a substantially horizontal disc cutter mounted on the lower end thereof, trash impelling blades rotatable with said shaft and extending upwardly from the cutter, and an upwardly extending trash deflecting shield mounted in front of said blades and having its lower edge adjacent the top of said blades.

11. In apparatus of the character described the combination of a substantially upright rotary shaft, a substantially horizontal disc cutter mounted on the lower end thereof, trash impelling blades rotatable with said shaft and extending upwardly from the cutter, and a trash deflecting shield mounted in front of said blades and extending above the same, said shield being forwardly and upwardly inclined and being convexed towards the front.

12. In apparatus of the character described the combination of a substantially upright rotary shaft, a substantially horizontal disc cutter mounted on the lower end thereof, trash impelling blades rotatable with said shaft and extending upwardly from the cutter, and a trash deflecting shield mounted in front of said blades and extending above the same, the lower edge of said shield extending below the top of said blades.

13. In apparatus of the character described the combination of frame members, bearings carried thereby, shafts mounted for rotation and vertical adjustment in said bearings, rotary cutters mounted on the lower ends of said shafts, variable length trash impelling means rotatable with said cutters and shafts and adjustable in length so as to substantially fill the space between the cutters and the frame members, and trash deflecting means mounted on the frame members in front of said shafts.

14. In apparatus of the character described the combination of frame members, bearings carried thereby, shafts mounted for rotation and vertical adjustment in said bearings, substantially horizontal disc cutters mounted on the lower ends of said shafts, telescopic trash impelling blades extending laterally from said shafts and rotatable therewith, and trash deflecting shields mounted on said frame members in front of said shafts and blades.

15. In apparatus of the character described the combination of frame members, bearings carried thereby, shafts mounted for rotation and vertical adjustment in said bearings, substantially horizontal disc cutters mounted on the lower ends of said shafts, telescopic trash impelling blades extending laterally from said shafts and rotatable therewith, and trash deflecting shields mounted on said frame members in front of said shafts and blades, said shields being forwardly and upwardly inclined and their lower edges extending below the tops of said blades.

16. In apparatus of the character described a substantially upright driving shaft, a rotary cutter mounted on the lower end thereof, and a trash impeller including a section keyed to said shaft but with respect to which said shaft is capable of vertical movement.

17. In apparatus of the character described, a shaft mounted for axial and rotary movement, a cutter mounted on the lower end of said shaft, and a multiple part telescopic trash impeller surrounding said shaft, each section of said impeller having separate driving engagement with said shaft whereby it is caused to rotate therewith.

18. In apparatus of the character described a substantially upright rotatable shaft, a substantially horizontal cutter mounted on said shaft, and a trash impeller member above said cutter, said member including a spider having outwardly extending trash impelling blades attached thereto.

19. In apparatus of the character described a substantially upright rotatable shaft, a substantially horizontal cutter mounted on said shaft, and a trash impeller member above said cutter, said member including a spider having outwardly extending trash impelling blades attached thereto, said blades being rearwardly curved at their outer edges.

20. In apparatus of the character described, a substantially upright rotary shaft, a substantially horizontal disc cutter mounted on the lower end thereof, a split spider, the parts of which are adapted to be clamped around said shaft, and trash impelling blades attached to the sections of said spider.

21. In apparatus of the character described, a substantially upright rotary shaft, a substantially horizontal disc cutter mounted on the lower end thereof, and a split spider, the parts of which are adapted to be clamped around said shaft, each section of the spider being provided with a laterally extending trash impelling blade.

22. A trash impeller including a supporting spider having sheet metal impeller blades extending laterally therefrom.

23. A trash impeller including a spider having trash impelling blades secured to surfaces thereof at opposite sides of a diameter and extending laterally therefrom in opposite directions in the general direction of said diameter.

24. A trash impeller including a spider having trash impelling blades secured to surfaces thereof at opposite sides of a diameter, and extending laterally therefrom in opposite directions in the general direction of said diameter, the outer edges of said blades being rearwardly curved.

25. A trash impeller of the character described having laterally extending blades, the outer edges of which are rearwardly and inwardly curved.

26. A trash impeller of the character described comprising a spider having impeller blades removably secured thereto.

27. A trash impeller of the character described having an upper impeller member and a second impeller member vertically adjustable with respect to said upper member, and means cooperating with said members for limiting the downward movement of said second member.

28. A trash impeller of the character described including an upper member, a lower member and an intermediate member, said lower and intermediate members being capable of vertical adjustment with respect to each other and with respect to said upper member, and means for limiting the downward movement of said intermediate member.

29. A trash impeller of the character described including a plurality of relatively adjustable sections, and means carried by said sections providing stops for limiting the movement of the sections away from one another.

30. In apparatus of the character described, a vertically adjustable substantially horizontal rotary cutter and a trash impeller associated therewith comprising a section movable with said cutter and a section having means for supporting the same independently of the cutter, and limiting stop means carried by said sections for limiting the downward adjustment of the cutter.

31. In apparatus of the character described the combination of a substantially horizontal rotary cutter mounted for vertical adjustment, and a sectional trash impeller associated therewith, all of the sections of which are vertically adjustable.

32. In apparatus of the character described the combination of a substantially horizontal rotary cutter, a trash impeller comprising a plurality of sections, one of which is mounted on and vertically adjustable with said cutter, said trash impeller also having an intermediate section vertically adjustable with respect to the section mounted on the cutter, and an upper section vertically adjustable with respect to the lower sections of the impeller and also capable of limited vertical adjustment with respect to the fixed parts of the apparatus.

33. In apparatus of the character described, a shaft bearing having a downwardly extending neck with a flange projecting therefrom, a shaft mounted for rotation and axial adjustment in said bearing, a substantially horizontal cutter mounted on the lower end of said shaft, and a trash impeller having a lower section movable with the cutter, and an upper section having a supporting part surrounding said bearing neck and having a part adapted to engage the flange on said neck, said upper section being capable of vertical adjustment on said neck.

34. In apparatus of the character described the combination of a substantially horizontal rotary cutter and a trash impeller extending upwardly therefrom, said impeller having an outwardly projecting flange at the top thereof.

35. In apparatus of the character described the combination of a substantially horizontal rotary cutter and a trash impeller associated therewith, said trash impeller including an upper section capable of limited vertical adjustment, and a relatively stationary trash deflecting shield mounted in front of said trash impeller, the lower edge of said shield extending as low as the top of said trash impeller section when in its lowest position.

36. In apparatus of the character described the combination of a vertically adjustable and rotatable shaft, a cutter mounted on said shaft, a sectional trash impeller associated with said shaft and cutter, means for hanging one section of said impeller to a fixed part of the apparatus and means for hanging another section of said impeller from said first section.

37. In apparatus of the character described the combination of a rotatable and vertically adjustable shaft, a hub fixed to the lower end thereof, a horizontal rotary cutter attached to said hub, and a sectional trash impeller having a lower section attached to said hub and another section movable with respect to said lower section, said movable section having a part adapted to be engaged and supported by said hub when said shaft and rotary cutter are elevated.

38. In apparatus of the character described the combination of a rotatable and vertically adjustable shaft, a substantially horizontal cutter carried thereby, and a trash impeller including a section movable up and down with the cutter and shaft, and a second section capable of vertical movement with respect to said first section and adapted to be picked up and elevated with said first section when said shaft and cutter are elevated.

39. In apparatus of the character described the combination of a bearing bracket having spaced bearings therein, a splined shaft mounted for rotation and axial adjustment in said bearings, a substantially horizontal rotary cutter mounted on the lower end of said shaft, and a sprocket wheel mounted on said shaft in driving engagement therewith in the space between said bearings, said shaft being adjustable axially through said sprocket.

40. In apparatus of the character described the combination of a bearing, a shaft mounted for rotary and axial adjustment therein, a rotary cutter mounted on the lower end of said shaft, and means for adjusting said shaft axially comprising a lever connected at one end with said shaft and having means for actuating the other end thereof, and a fulcrum link pivoted at its lower end to a fixed support and at its upper end to an intermediate point of said lever.

41. In apparatus of the character described the combination of a rotatable and axially movable shaft having a substantially horizontal cutter at the lower end thereof, said shaft having a block swivelled to the upper end thereof, an elevating and depressing lever for said shaft having a yoke-shaped end embracing and pivoted to said block, a fulcrum link pivoted at one end to a fixed support and at its other end to an intermediate portion of said lever, an actuating crank, and a link connecting said crank with the other end of said lever.

42. In apparatus of the character described, a flat rotary disc cutter, and means for mounting the same in position to rotate entirely beneath the ground surface about an axis inclined slightly forward of the vertical in the direction of travel of the apparatus.

43. In apparatus of the character described, a plurality of overlapping flat disc cutters, and means for mounting the same in position to rotate entirely beneath the ground surface about an axis inclined slightly forward of the vertical in the direction of travel of the apparatus.

44. In apparatus of the character described, a plurality of overlapping flat disc cutters, and means for mounting the same for rotation about an axis inclined slightly forward of the vertical in the direction of travel of the apparatus, and for movement upwardly and downwardly on that axis.

GEORGE D. LUCE.
F. C. DOUGLAS WILKES.